US010684740B2

(12) United States Patent
Amerige

(10) Patent No.: US 10,684,740 B2
(45) Date of Patent: *Jun. 16, 2020

(54) INTERVENTION CONDITIONS

(71) Applicant: Facebook, Inc., Menlo Park, CA (US)

(72) Inventor: Brian D. Amerige, Berkeley, CA (US)

(73) Assignee: Facebook, Inc., Menlo Park, CA (US)

( * ) Notice: Subject to any disclaimer, the term of this patent is extended or adjusted under 35 U.S.C. 154(b) by 875 days.

This patent is subject to a terminal disclaimer.

(21) Appl. No.: 14/071,028

(22) Filed: Nov. 4, 2013

(65) Prior Publication Data

US 2015/0128086 A1 May 7, 2015

(51) Int. Cl.
*G06F 3/0482* (2013.01)
*G06F 3/0488* (2013.01)

(52) U.S. Cl.
CPC ........ *G06F 3/0482* (2013.01); *G06F 3/04883* (2013.01)

(58) Field of Classification Search
CPC ...................................................... G06F 3/048
USPC ........................................................ 715/835
See application file for complete search history.

(56) References Cited

U.S. PATENT DOCUMENTS

| | | | | |
|---|---|---|---|---|
| 2005/0216883 A1* | 9/2005 | Ishimitsu | .............. | G06F 9/4443 717/105 |
| 2006/0212833 A1* | 9/2006 | Gallagher | ............. | G06T 11/206 715/848 |
| 2010/0079493 A1* | 4/2010 | Tse | ........................ | G06F 3/0425 345/650 |
| 2010/0241973 A1* | 9/2010 | Whiddett | ............ | G06F 3/04883 715/762 |
| 2011/0179380 A1* | 7/2011 | Shaffer | ............... | G06F 3/04883 715/781 |
| 2011/0252368 A1* | 10/2011 | Anzures | ................ | G06F 9/4443 715/823 |
| 2011/0252381 A1* | 10/2011 | Chaudhri | .............. | G06F 3/0485 715/838 |
| 2011/0307833 A1* | 12/2011 | Dale | .................... | G06F 3/04886 715/835 |
| 2013/0268837 A1* | 10/2013 | Braithwaite | .......... | G06F 9/4443 715/234 |

(Continued)

OTHER PUBLICATIONS

W3C, Document Object Model (DOM) Level 3 Events Specification, Nov. 5, 2013, <URL=https://www.w3.org/TR/2013/WD-DOM-Level-3-Events-20131105/>.*

(Continued)

*Primary Examiner* — James T Tsai
(74) *Attorney, Agent, or Firm* — Jordan IP Law, LLC

(57) ABSTRACT

In one embodiment, a method includes receiving a touch input within a particular region of a display area of the computing device. The display area presents a user interface (UI) including a number of views organized in a hierarchy. One or more of the views has a gesture recognizer configured to process a touch input detected within the regions of the display area associated with each of the views. Each of the views corresponds to one or more regions of the display area. One or more of the gesture recognizers has one or more intervention conditions. A particular one of the views is a default view to process the touch input. The method also includes evaluating the intervention conditions to identify a particular one of the views from among the number of views to process the touch input.

20 Claims, 4 Drawing Sheets

(56) References Cited

U.S. PATENT DOCUMENTS

2014/0033129 A1* 1/2014 Huang ................. G06F 3/0488
                                                    715/835
2015/0058774 A1* 2/2015 Shenoy ................ G06F 3/0482
                                                    715/771

OTHER PUBLICATIONS

W3C Document Object Model (DOM) Level 3 Events Specification Draft 06 ("DOM L3 Events"), as of Sep. 6, 2012.*

* cited by examiner

INTERVENTION CONDITIONS

TECHNICAL FIELD

This disclosure generally relates to mobile devices.

BACKGROUND

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a user interface (UI) of an application that includes a nested hierarchy of views may enable a particular view of the nested hierarchy to over-ride the default behavior of a hit-test view. Normally, the default behavior of the hit test allocates processing of a touch input to the lowest view that contains the touch input. Particular embodiments enable a method of allowing a view higher in the hierarchy to express it's interest in "winning" the hit test or process the touch input. Particular embodiments may assume that the higher view in the hierarchy expressing interest in processing the touch input is parent view of the hit test winner view. The higher view with a gesture recognizer and expresses interest in processing the touch input may include one or more intervention conditions that may be evaluated each time a touch input (e.g. gesture) is detected. For example, the intervention condition may be evaluated as a Boolean that returns a true or false value for the higher view to process the touch input. Furthermore, a "no" result from the intervention condition evaluation results in the hit-test view processing the touch input. For example, a touch input such as a pinch and zoom gesture of a photo may have an associated intervention condition to determine whether the view is currently zoomed out all the way. In this case, when the intervention condition is evaluated as "true" (e.g. the photo is being viewed as a full view), the view with the intervention condition may intervene and over-ride the hit test behavior by dismissing the photo.

DESCRIPTION OF EXAMPLE EMBODIMENTS

Figure 1:
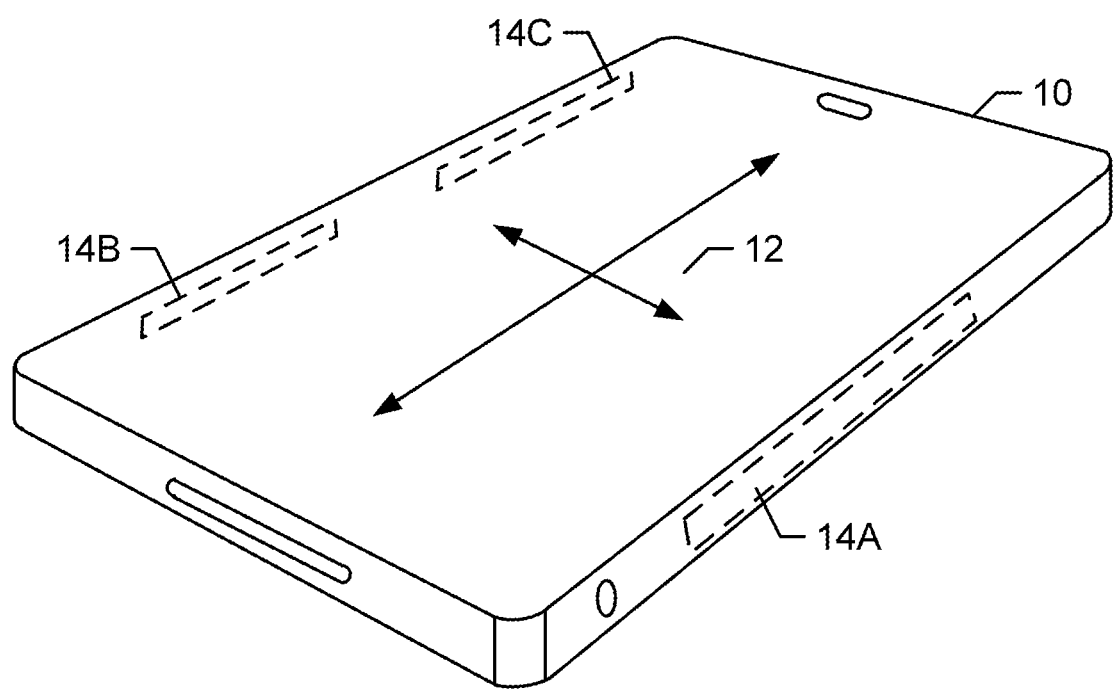
FIG. 1 illustrates an example mobile device.

FIG. 1 illustrates an example mobile computing device. In particular embodiments, the client system may be a mobile computing device 10 as described above. This disclosure contemplates mobile computing device 10 taking any suitable physical form. In particular embodiments, mobile computing device 10 may be a computing system as described below. As example and not by way of limitation, mobile computing device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile computing device 10 may have a touch sensor 12 as an input component. In the example of FIG. 1, touch sensor 12 is incorporated on a front surface of mobile computing device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 1, one or more antennae 14A-B may be incorporated into one or more sides of mobile computing device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied the current as electromagnetic (EM) waves. During reception of signals, antennae 14A-B convert the power of an incoming EM wave into a voltage at the terminals of antennae 14A-B. The voltage may be transmitted to a receiver for amplification.

Mobile computing device 10 many include a communication component coupled to antennae 14A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component 20 for it. As an example and not by way of limitation, mobile computing device 10 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile computing device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile computing device 10 may include any suitable communication component for any of these networks, where appropriate.

In particular embodiments, an application executed on mobile computing device 10 may provide a user interface (UI) on a display of mobile computing device 10. As described below, the user of mobile computing device 10 may interact with the UI of a particular application through touch inputs detected by touch sensor 12. In particular embodiments, the application may correlate one or more touch inputs detected by touch sensor 12 with one or more interactions with the application. Although this disclosure illustrates and describes handling gestures on a particular type of computing device with a touch sensor, this disclosure contemplates handling gestures by any suitable type of computing device with a touch sensor, such as for example, a personal computer with a touch display, tablet computer, connected television, or smartphone.

Figure 2:
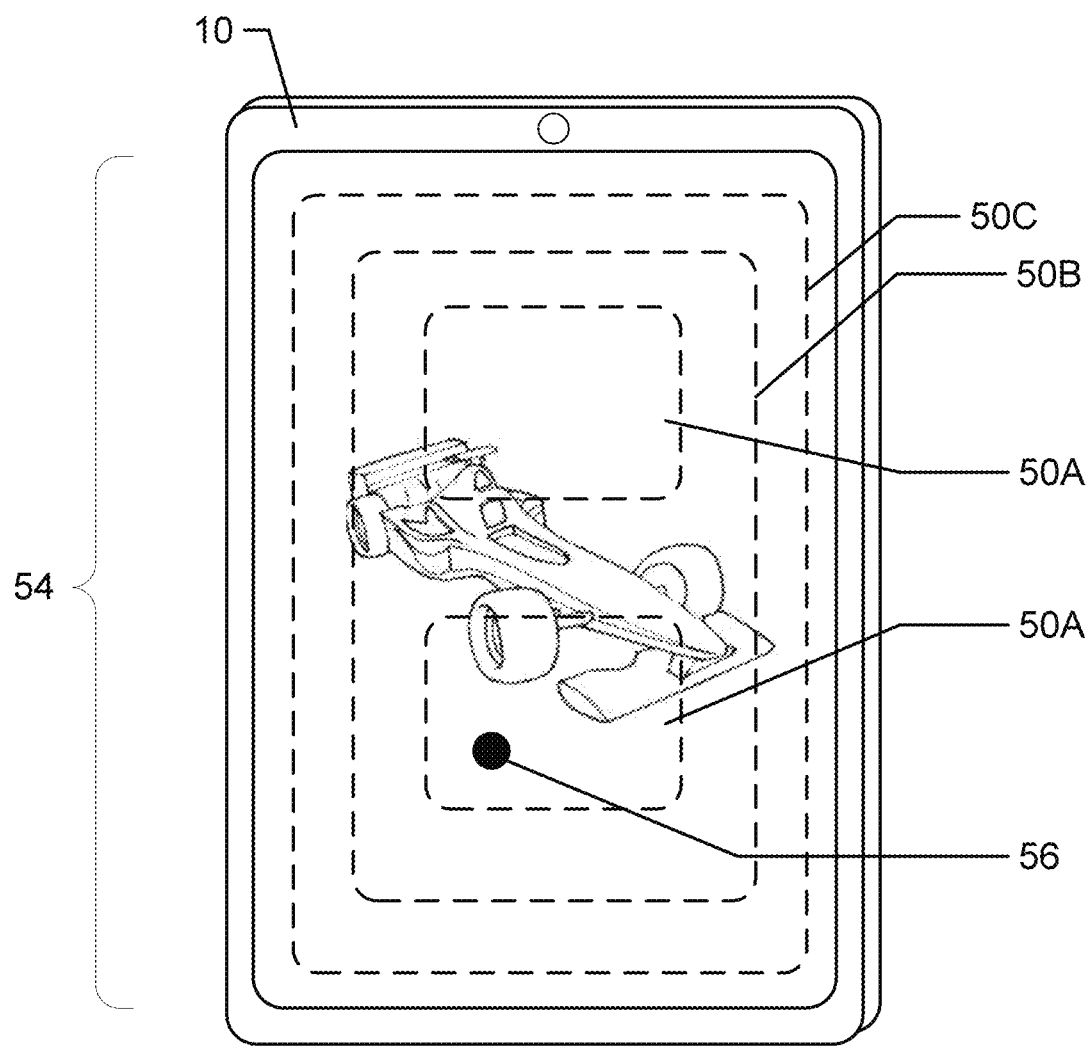
FIG. 2 illustrates an example wireframe of an example user interface with an example nested hierarchy of views.

FIG. 2 illustrates an example wireframe of an example user interface with an example nested hierarchy of views. In particular embodiments, the UI of an application provided for display on display area 54 of an example computing device, such as for example a mobile computing device 10, may include one or more views 50A-C that each correspond to a particular region of display area 54. Furthermore, a particular view 50A-C may handle processing one or more touch inputs 56 detected within the associated region of display area 54. In particular embodiments, views 50A-C with overlapping regions of display area 54 may be organized into a nested hierarchy. In particular embodiments, a gesture recognizer associated with one or more views 50A-C in the nested hierarchy may be eligible to process touch inputs 56 within its associated region of display area 54. In the example of FIG. 2, view 50C has a portion of its corresponding area of display 54 that overlaps the corresponding area of view 50B. Furthermore, a region of view 50B may overlap the area of display area 54 that corresponds to view 50A. As an example and not by way of limitation, a default behavior of a particular nested hierarchy of views 50A-C may process touch inputs 56 by assigning the highest priority to a "hit-test" view 50A-C that is lowest in the hierarchy that encompasses touch input 56 and does not substantially encompass another view 50A-C within it. For example, touch input 56 within a particular region of display area 54 corresponding to views 50A-C of the hierarchy may be processed by hit-test view 50A. Although this disclosure illustrates and describes a particular configuration of a particular number of views associated with particularly shaped regions having particular dimensions, this disclosure contemplates any suitable configuration of any suitable number of views associated with any suitably shaped region having any suitable dimensions.

In particular embodiments, the UI of an example application executed on the example computing device, such as for example mobile computing device 10, may include one or more views 50A-C with a gesture recognizer having one or more associated intervention conditions. As an example and not by way of limitation, an intervention condition is a conditional statement or expression that may over-ride a default hit-touch behavior to allow a non-hit-test view (e.g. 50B-C) process touch input 56 based at least in part on evaluation of the conditional statement or expression. Furthermore, the intervention conditions may be evaluated as a Boolean function that returns a "true" or "false" value, such that the gesture recognizer of a view (e.g. 50C) higher in the nested hierarchy becomes eligible to process touch input 56 in place of the hit-test view (e.g. 50A) that would by default process touch input 56. For example, touch input 56 may be processed by the hit-test view (e.g. 50A) based at least in part on the evaluation of the intervention conditions associated with one or more "parent" views 50B-C returning a value of "false." In particular embodiments, a gesture recognizer may have multiple or nested intervention conditions that are each evaluated when touch input 56 is detected.

In particular embodiments, a default behavior of the hierarchy of views 50A-C of an application may be modified such that touch input 56 may be processed by a view 50B-C higher in the nested hierarchy than hit-test view 50A, such as for example one of views 50B-C. As an example and not by way of limitation, views (e.g. 50B-C) higher up the nested hierarchy may be considered a "parent" view of the hit-test view (e.g. 50A). Furthermore, the example application may identify the particular non-hit-test view (e.g. 50C) that is a parent of the hit-test view (e.g. 50A) for processing touch input 56 based at least in part on evaluation of one or more intervention conditions of the gesture recognizer of the particular non-hit-test view (e.g. 50C). In particular embodiments, a particular non-hit-test view (e.g. 50C) may be identified and designated to process touch input 56 and the example application may force the gesture recognizer associated with hit-test view 50A to defer processing of touch input 56 to the gesture recognizer associated with the particular non-hit-test view (e.g. 50C). Although this disclosure describes a particular view in a nested hierarchy being the view to process the touch input, this disclosure contemplates designating any suitable view in the nested hierarchy as the view to process the touch input.

In particular embodiments, an application may evaluate one or more intervention conditions associated with the gesture recognizer of one or more views 50A-C of the nested hierarchy to determine one or more views 50A-C that are eligible to process touch input 56. In particular embodiments, the intervention conditions may be evaluated each time a touch input 56 (e.g. gesture) is detected. As an example and not by way of limitation, in response to detecting touch input 56, each view 50A-C in the hierarchy eligible to process touch input 56 may be queried (e.g. from lowest to highest views 50A-C in the nested hierarchy) to determine which views 50A-C have gesture recognizers with an intervention condition. For example, the application may initially query the gesture recognizer associated with view 50A, then the gesture recognizer of views 50B-C according to the hierarchy of views 50A-C described above. Furthermore, the application executed on mobile computing device 10 may retarget processing of touch input 56 from the gesture recognizer associated with the hit-test view (e.g. 50A) to the gesture recognizer of a non-hit-test view (e.g. 50C) higher in the nested hierarchy. As an example and not by way of limitation, the gesture recognizer of a particular non-hit-test view (e.g. 50C) with the intervention condition described above may retarget processing of touch input 56 away from the gesture recognizer of hit-test view (e.g. 50A) in response to the intervention condition being evaluated as "true," thereby temporarily modifying the nested hierarchy. The gesture recognizer of the particular non-test-hit view (e.g. 50C) may dismiss the displayed image in response to the intervention condition being evaluated as "true."

As an example and not by way of limitation, a UI of an example computing device, such as mobile computing device 10, may be configured to display one or more images and to process touch inputs 56 provided by a user through gesture recognizers of the nested hierarchy of views 50A-C. Furthermore, the gesture recognizer of hit-test view 50A may be configured to process touch input 56 corresponding to a "pinch and zoom" gesture by increasing the magnification of the displayed image. An example intervention condition associated with processing the particular touch input 56 may be determining whether the image displayed on the UI is zoomed out to a full view. The gesture recognizer of a particular non-hit-test view (e.g. 50C) may be configured to dismiss the displayed image in response to a touch input. In particular embodiments, the particular non-hit-test view (e.g. 50C) may retarget the processing of touch input 56 away from the hit-test view (e.g. 50A) and the gesture recognizer of non-hit-test view (e.g. 50C) may process touch input 56 corresponding to the pinch and zoom gesture and dismiss the image based at least in part on the intervention condition being evaluated as "true" (e.g. the image being viewed as a full view).

As another example, a UI may be configured to provide for display a list of content objects, such as for example content objects in a newsfeed of a social-networking system. Furthermore, the gesture recognizer of the hit-test view (e.g. 50A) may be configured to process touch input 56 corresponding to a "scroll" gesture by navigating through the list of content objects. An example intervention condition associated with the particular touch input 56 may be determining whether navigation is beyond the top of the list. Furthermore, as the default behavior, the gesture recognizer of the hit-test view (e.g. 50A) may process touch input 56 corresponding to a scroll gesture to "bounce" the motion from the top of the displayed list of content objects. The gesture recognizer of a particular non-hit-test view (e.g. 50C) that has the intervention condition described above may retarget the gesture processing away from the hit-test view (e.g. 50A) and process the scroll gesture by dismissing the displayed list based at least in part on the intervention condition being evaluated as "true" (e.g. the list being at the top). Although this disclosure describes gesture recognizers that evaluate particular intervention conditions, this disclosure contemplates gesture recognizers that evaluate any suitable intervention conditions, including intervention conditions that use logical operations, such as AND or OR operations.

Figure 3:
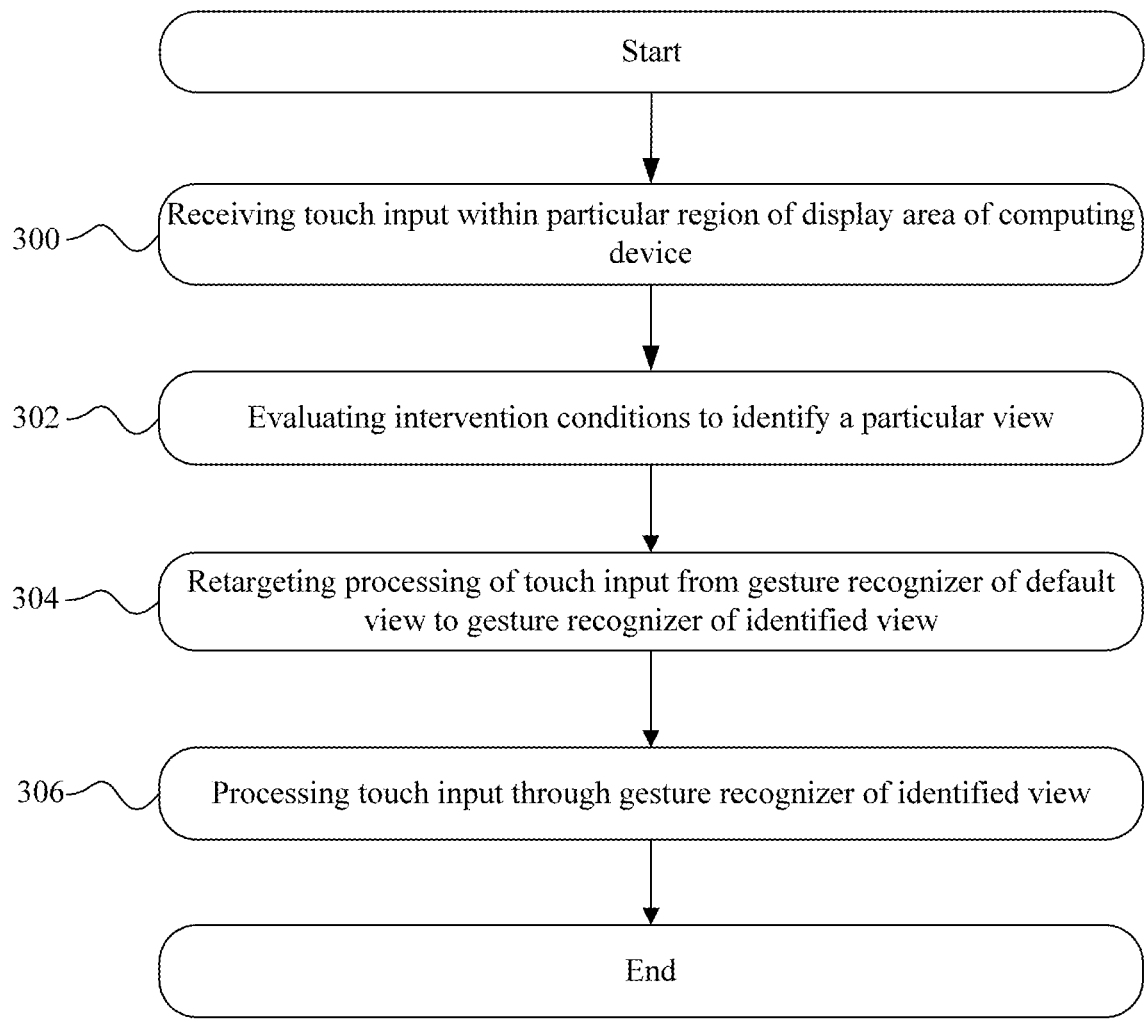
FIG. 3 illustrates an example method for handling overloaded gestures.

FIG. 3 illustrates an example method for handling overloaded gestures based on intervention conditions. The method may start at step 300, where a computing device receives a touch input within a particular region of a display area of the computing device. In particular embodiments, the display area of the computing device may present a UI that includes views organized in a hierarchy. In particular embodiments, one or more of the views may have a gesture recognizer configured to process a touch input detected within the regions of the display area associated with each of the views and each of the views may correspond to one or more regions of the display area. In particular embodiments, a particular view of the hierarchy may be a default view to process the touch input. In particular embodiments, one or more of the gesture recognizers of the views may have one or more intervention conditions. Step 302 evaluates, by the computing device, the intervention conditions to identify a particular view from among the views of the hierarchy to process the touch input. In particular embodiments, evaluating the intervention condition may return a Boolean result. Step 304 retargets, by the computing device, processing of the touch input from the gesture recognizer of the default view to the gesture recognizer of the identified view. In particular embodiments, the identified view is a parent view of the default view. At step 306, the computing device processes the touch input through the gesture recognizer of the identified view, at which point the method may end. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for handling overloaded gestures based on intervention conditions including the particular steps of the method of FIG. 3, this disclosure contemplates any suitable method for handling overloaded gestures based on intervention conditions including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
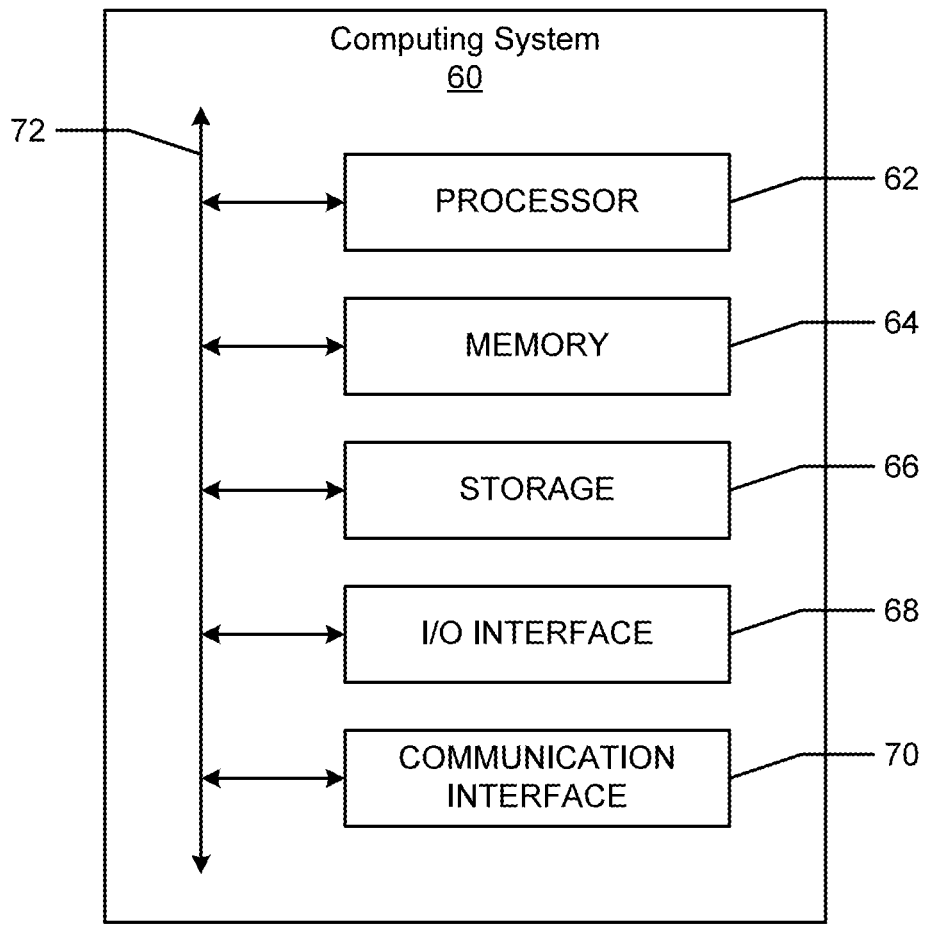
FIG. 4 illustrates an example computing system.

FIG. 4 illustrates example computing system. In particular embodiments, one or more computer systems 60 perform one or more steps of one or more methods described or illustrated herein. In particular embodiments, one or more computer systems 60 provide functionality described or illustrated herein. In particular embodiments, software running on one or more computer systems 60 performs one or more steps of one or more methods described or illustrated herein or provides functionality described or illustrated herein. Particular embodiments include one or more portions of one or more computer systems 60. Herein, reference to a computer system may encompass a computing device, where appropriate. Moreover, reference to a computer system may encompass one or more computer systems, where appropriate.

This disclosure contemplates any suitable number of computer systems 60. This disclosure contemplates computer system 60 taking any suitable physical form. As example and not by way of limitation, computer system 60 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 60 may include one or more computer systems 60; be unitary or distributed; span multiple locations; span multiple machines; span multiple data centers; or reside in a cloud, which may include one or more cloud components in one or more networks. Where appropriate, one or more computer systems 60 may perform without substantial spatial or temporal limitation one or more steps of one or more methods described or illustrated herein. As an example and not by way of limitation, one or more computer systems 60 may perform in real time or in batch mode one or more steps of one or more methods described or illustrated herein. One or more computer systems 60 may perform at different times or at different locations one or more steps of one or more methods described or illustrated herein, where appropriate.

In particular embodiments, computer system 60 includes a processor 62, memory 64, storage 66, an input/output (I/O) interface 68, a communication interface 70, and a bus 72. Although this disclosure describes and illustrates a particular computer system having a particular number of particular components in a particular arrangement, this disclosure contemplates any suitable computer system having any suitable number of any suitable components in any suitable arrangement.

In particular embodiments, processor 62 includes hardware for executing instructions, such as those making up a computer program. As an example and not by way of limitation, to execute instructions, processor 62 may retrieve (or fetch) the instructions from an internal register, an internal cache, memory 64, or storage 66; decode and execute them; and then write one or more results to an internal register, an internal cache, memory 64, or storage 66. In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 64 or storage 66, and the instruction caches may speed up retrieval of those instructions by processor 62. Data in the data caches may be copies of data in memory 64 or storage 66 for instructions executing at processor 62 to operate on; the results of previous instructions executed at processor 62 for access by subsequent instructions executing at processor 62 or for writing to memory 64 or storage 66; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates processor 62 including any suitable number of any suitable internal registers, where appropriate. Where appropriate, processor 62 may include one or more arithmetic logic units (ALUs); be a multi-core processor; or include one or more processors 62. Although this disclosure describes and illustrates a particular processor, this disclosure contemplates any suitable processor.

In particular embodiments, memory 64 includes main memory for storing instructions for processor 62 to execute or data for processor 62 to operate on. As an example and not by way of limitation, computer system 60 may load instructions from storage 66 or another source (such as, for example, another computer system 60) to memory 64. Processor 62 may then load the instructions from memory 64 to an internal register or internal cache. To execute the instructions, processor 62 may retrieve the instructions from the internal register or internal cache and decode them. During or after execution of the instructions, processor 62 may write one or more results (which may be intermediate or final results) to the internal register or internal cache. Processor 62 may then write one or more of those results to memory 64. In particular embodiments, processor 62 executes only instructions in one or more internal registers or internal caches or in memory 64 (as opposed to storage 66 or elsewhere) and operates only on data in one or more internal registers or internal caches or in memory 64 (as opposed to storage 66 or elsewhere). One or more memory buses (which may each include an address bus and a data bus) may couple processor 62 to memory 64. Bus 72 may include one or more memory buses, as described below. In particular embodiments, one or more memory management units (MMUs) reside between processor 62 and memory 64 and facilitate accesses to memory 64 requested by processor 62. In particular embodiments, memory 64 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 64 may include one or more memories 64, where appropriate. Although this disclosure describes and illustrates particular memory, this disclosure contemplates any suitable memory.

In particular embodiments, storage 66 includes mass storage for data or instructions. As an example and not by way of limitation, storage 66 may include a hard disk drive (HDD), a floppy disk drive, flash memory, an optical disc, a magneto-optical disc, magnetic tape, or a Universal Serial Bus (USB) drive or a combination of two or more of these. Storage 66 may include removable or non-removable (or fixed) media, where appropriate. Storage 66 may be internal or external to computer system 60, where appropriate. In particular embodiments, storage 66 is non-volatile, solid-state memory. In particular embodiments, storage 66 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 66 taking any suitable physical form. Storage 66 may include one or more storage control units facilitating communication between processor 62 and storage 66, where appropriate. Where appropriate, storage 66 may include one or more storages 66. Although this disclosure describes and illustrates particular storage, this disclosure contemplates any suitable storage.

In particular embodiments, I/O interface 68 includes hardware, software, or both providing one or more interfaces for communication between computer system 60 and one or more I/O devices. Computer system 60 may include one or more of these I/O devices, where appropriate. One or more of these I/O devices may enable communication between a person and computer system 60. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 68 for them. Where appropriate, I/O interface 68 may include one or more device or software drivers enabling processor 62 to drive one or more of these I/O devices. I/O interface 68 may include one or more I/O interfaces 68, where appropriate. Although this disclosure describes and illustrates a particular I/O interface, this disclosure contemplates any suitable I/O interface.

In particular embodiments, communication interface 70 includes hardware, software, or both providing one or more interfaces for communication (such as for example, packet-based communication) between computer system 60 and one or more other computer systems 60 or one or more networks. As an example and not by way of limitation, communication interface 70 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 70 for it. As an example and not by way of limitation, computer system 60 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 60 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 60 may include any suitable communication interface 70 for any of these networks, where appropriate. Communication interface 70 may include one or more communication interfaces 70, where appropriate. Although this disclosure describes and illustrates a particular communication interface, this disclosure contemplates any suitable communication interface.

In particular embodiments, bus 72 includes hardware, software, or both coupling components of computer system 60 to each other. As an example and not by way of limitation, bus 72 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 72 may include one or more buses 72, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a computing device, receiving a touch input within a particular region of a display area of the computing device, the display area presenting a user interface (UI) comprising a plurality of views organized in a hierarchy, one or more of the views having a gesture recognizer configured to process a touch input detected within one or more regions of the display area associated with each of the views, each of the views corresponding to one or more regions of the display area, one or more of the gesture recognizers having one or more intervention conditions, a particular one of the views being a default view to process the touch input;
by the computing device, determining a plurality of eligible views from the plurality of views based at least in part on the particular region of the touch input corresponding to the region of the respective view;
by the computing device, evaluating the intervention conditions of the plurality of eligible views to identify a particular one of the eligible views from among the plurality of eligible views to process the touch input, wherein the evaluation of the intervention conditions is performed based on a type associated with the touch input with regard to content displayed in the display area and in an order in accordance to the hierarchy;
by the computing device, temporarily retargeting processing of the touch input from the gesture recognizer of the default view to the gesture recognizer of the identified eligible view based on the evaluation of the intervention conditions;
by the computing device, processing the touch input through the gesture recognizer of the identified eligible view; and
by the computing device, temporarily performing an action with regard to the content displayed in the display area in accordance to the gesture recognizer of the identified eligible view instead of an action in accordance to the gesture recognizer of the default view based on the temporary retargeting of the processing of the touch input.

2. The method of claim 1, wherein at least one of the intervention conditions comprises the conditional statement that is evaluated based at least in part on the touch input.

3. The method of claim 1, wherein the evaluation is performed in response to detecting the touch input within the corresponding regions of each of the eligible views.

4. The method of claim 1, wherein the particular view is a parent view of the default view.

5. The method of claim 1, wherein the evaluation of the intervention conditions comprises returning a Boolean result for each intervention condition.

6. The method of claim 5, wherein the evaluation further comprises identifying the particular one of the views based at least in part on the Boolean result being true for a particular intervention condition.

7. The method of claim 1, wherein:
at least one of the intervention conditions comprises determining whether the UI is in a full view mode; and
processing the touch input comprises dismissing an object being displayed.

8. The method of claim 1, wherein:
at least one of the intervention conditions comprises determining whether a list of content objects displayed in the UI is positioned at a top of the list; and processing the touch input comprises dismissing the list of content objects.

9. One or more computer-readable non-transitory storage media embodying software configured when executed to:
receive a touch input within a particular region of a display area of a computing device, the display area presenting a user interface (UI) comprising a plurality of views organized in a hierarchy, one or more of the views having a gesture recognizer configured to process a touch input detected within one or more regions of the display area associated with each of the views, each of the views corresponding to one or more regions of the display area, one or more of the gesture recognizers having one or more intervention conditions, a particular one of the views being a default view to process the touch input;
determine a plurality of eligible views from the plurality of views based at least in part on the particular region of the touch input corresponding to the region of the respective view;
evaluate the intervention conditions of the plurality of eligible to identify a particular one of the eligible views from among the plurality of eligible views to process the touch input, wherein the evaluation of the intervention conditions is performed based on a type associated with the touch input with regard to content displayed in the display area and in an order in accordance to the hierarchy;
temporarily retarget processing of the touch input from the gesture recognizer of the default view to the gesture recognizer of the identified eligible view based on the evaluation of the intervention conditions;
process the touch input through the gesture recognizer of the identified eligible view; and
temporarily perform an action with regard to the content displayed in the display area in accordance to the gesture recognizer of the identified eligible view instead of an action in accordance to the gesture recognizer of the default view based on the temporary retargeting of the processing of the touch input.

10. The media of claim 9, wherein at least one of the intervention conditions comprises a conditional statement that is evaluated based at least in part on the touch input.

11. The media of claim 9, wherein the evaluation is performed in response to detecting the touch input within the corresponding regions of each of the eligible views.

12. The media of claim 9, wherein the particular view is a parent view of the default view.

13. The media of claim 9, wherein the software is further configured to return a Boolean result for each intervention condition.

14. The media of claim 13, wherein the software is further configured to identify the particular one of the views based at least in part on the Boolean result being true for a particular intervention condition.

15. The media of claim 9, wherein:
at least one of the intervention conditions comprises determining whether the UI is in a full view mode; and
processing the touch input comprises dismissing an object being displayed.

16. The media of claim 9, wherein:
at least one of the intervention conditions comprises determining whether a list of content objects displayed in the UI is positioned at a top of the list; and
processing the touch input comprises dismissing the list of content objects.

17. A device comprising:
a processor; and
one or more computer-readable non-transitory storage media coupled to the processor and embodying software that:
receive a touch input within a particular region of a display area of a computing device, the display area presenting a user interface (UI) comprising a plurality of views organized in a hierarchy, one or more of the views having a gesture recognizer configured to process a touch input detected within one or more regions of the display area associated with each of the views, each of the views corresponding to one or more regions of the display area, one or more of the gesture recognizers having one or more intervention conditions, a particular one of the views being a default view to process the touch input;
determine a plurality of eligible views from the plurality of views based at least in part on the particular region of the touch input corresponding to the region of the respective view;
evaluate the intervention conditions of the plurality of eligible views to identify a particular one of the eligible views from among the plurality of eligible views to process the touch input, wherein the evaluation of the intervention conditions is performed based on a type associated with the touch input with regard to content displayed in the display area and in an order in accordance to the hierarchy;
temporarily retarget processing of the touch input from the gesture recognizer of the default view to the gesture recognizer of the identified eligible view based on the evaluation of the intervention conditions;
process the touch input through the gesture recognizer of the identified eligible view; and
temporarily perform an action with regard to the content displayed in the display area in accordance to the gesture recognizer of the identified eligible view instead of an action in accordance to the gesture recognizer of the default view based on the temporary retargeting of the processing of the touch input.

18. The device of claim 17, wherein at least one of the intervention conditions comprises a conditional statement that is evaluated based at least in part on the touch input.

19. The device of claim 17, wherein the evaluation is performed in response to detecting the touch input within the corresponding regions of each of the eligible views.

20. The device of claim 17, wherein the particular view is a parent view of the default view.

* * * * *